(12) United States Patent
Feilner et al.

(10) Patent No.: US 11,184,484 B2
(45) Date of Patent: Nov. 23, 2021

(54) PRIORITIZATION OF SPEAKERS IN A HEARING DEVICE SYSTEM

(71) Applicant: SONOVA AG, Staefa (CH)

(72) Inventors: Manuela Feilner, Egg bei Zürich (CH); Harald Kruger, Affoltern am Albis (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/831,405

(22) Filed: Mar. 26, 2020

(65) Prior Publication Data

US 2020/0329155 A1 Oct. 15, 2020

(30) Foreign Application Priority Data

Apr. 9, 2019 (EP) .................................... 19168155

(51) Int. Cl.
*H04M 3/56* (2006.01)
*H04L 29/06* (2006.01)
*H04R 3/00* (2006.01)

(52) U.S. Cl.
CPC .......... *H04M 3/568* (2013.01); *H04L 65/403* (2013.01); *H04R 3/005* (2013.01); *H04M 2203/5072* (2013.01)

(58) Field of Classification Search
None
See application file for complete search history.

(56) References Cited

U.S. PATENT DOCUMENTS

| | | | |
|---|---|---|---|
| 6,804,340 B2 | 10/2004 | Howard et al. | |
| 7,180,997 B2 | 2/2007 | Knappe | |
| 7,330,541 B1 | 2/2008 | Surazski | |
| 8,645,872 B2 | 2/2014 | Maxfield | |
| 9,420,108 B1 | 8/2016 | Bostick | |
| 9,537,911 B1 | 1/2017 | Bostick | |

(Continued)

FOREIGN PATENT DOCUMENTS

| | | |
|---|---|---|
| CN | 1938963 | 3/2007 |
| CN | 106797519 | 5/2017 |

(Continued)

OTHER PUBLICATIONS

"Glossary of linguistik terms", URL: https//glossary.sil.org/term/overlap; May 29, 2018.

(Continued)

*Primary Examiner* — Antim G Shah

(74) *Attorney, Agent, or Firm* — ALG Intellectual Property, LLC

(57) ABSTRACT

Systems and methods for controlling hearing devices are disclosed. Each hearing device is worn by a user, the hearing devices being communicatively interconnected with each other for data exchange to form a hearing device system. A method includes acquiring a sound signal of each user with a microphone of the hearing device of the user; determining from the sound signal a speaker signal, which indicates, whether the user is a speaking user; determining a priority score for each user from the speaker signal of the user; outputting sound signals from speaking users to the users via the hearing devices of the users, such that sound signals from speaking users with a priority score smaller than a threshold are muted.

11 Claims, 2 Drawing Sheets

(56) References Cited

U.S. PATENT DOCUMENTS

| | | |
|---|---|---|
| 9,591,141 B1 | 3/2017 | Bostick |
| 9,621,731 B2 | 4/2017 | Bostick |
| 2002/0181686 A1 | 12/2002 | Howard et al. |
| 2004/0052218 A1 | 3/2004 | Knappe |
| 2005/0239486 A1 | 10/2005 | D'Avello et al. |
| 2006/0176831 A1 | 8/2006 | Greenberg |
| 2012/0226997 A1 | 9/2012 | Pang |
| 2012/0250846 A1 | 10/2012 | O'Sullivan et al. |
| 2017/0048392 A1 | 2/2017 | Bostick |
| 2017/0048393 A1 | 2/2017 | Bostick |
| 2017/0311092 A1 | 10/2017 | Segall |
| 2020/0329084 A1* | 10/2020 | Kegel ................ H04L 65/4038 |

FOREIGN PATENT DOCUMENTS

| | | |
|---|---|---|
| EP | 1560140 | 8/2005 |
| EP | 1738483 | 1/2007 |
| EP | 1393540 | 9/2009 |
| EP | 3202160 | 4/2018 |
| EP | 2896194 | 5/2018 |
| WO | 02091724 | 11/2002 |
| WO | 2004023774 | 3/2004 |
| WO | 2005101688 | 10/2005 |
| WO | 2008082203 | 7/2008 |
| WO | 2014043555 | 3/2014 |
| WO | 2016050312 | 4/2016 |

OTHER PUBLICATIONS

Adler, R.B et al., "Understanding Human Communication", Oxford University Press, Twelfth Edition, 2014.

Anemuller, et al., "A Discriminative Learning Approach to Probabilistic Acoustic Source Localization", 14th International Workshop on Acoustic Signal Enhancement (IWAENC), Conference Paper, Sep. 2014. DOI: 10.1109/IWAENC.2014.6953346.

Enfield, et al., "How we talk, the inner working of conversation", Basic Books, 2017.

Hochreiter, et al., "Long Short-Term Memory", Neural Computation, 9(8):1735-1780, 1997.

Moerman, M. et al., "Talking Culture: Ethnography and Conversation Analysis", University of Pennsylvania Press, Conduct and Communication Series 1988, https://doi.org/10.9783/9780812200355.

Murray, S.O. et al., "The Sound of Simultaneous Speech, the Meaning of Interruption", Journal of Pragmatics 12 (1988) 115-116. Elsevier Science Publishers B.V. (North-Holland).

Taylor, et al., "Improving Deep Learning Using Generic Data Augmentation", arXiv:1708.06020v1 [cs.LG] Aug. 20, 2017.

Wikipedia, "Recurrent Neural Network", Wikipedia—https://en.wikipedia.org/wiki/Recurrent_neural_network, as accessed on Feb. 26, 2021.

* cited by examiner

PRIORITIZATION OF SPEAKERS IN A HEARING DEVICE SYSTEM

RELATED APPLICATIONS

The present application claims priority to EP Patent Application No. 19168155.0, filed on Apr. 9, 2019, and entitled "PRIORITIZATION OF SPEAKERS IN A HEARING DEVICE SYSTEM," the contents of which are hereby incorporated by reference in their entirety.

BACKGROUND INFORMATION

In some hearing devices, a wireless network may be integrated, which may improve the communication in noise between users of the hearing devices. The hearing devices may be adapted to pick-up the users' voice with their integrated microphones, may transmit the acquired audio signals to other hearing devices via the wireless network and may make the picked-up voice audible via the integrated speaker of another hearing device.

Conversations with several participants have the risk to be disordered and inefficient. Especially hearing impaired individuals may have difficulties to participate in a discussion with dominant speakers who give others rare time to participate.

U.S. Pat. No. 7,330,541 B1 describes a conferencing system, which provides automated conference moderation at appropriate times to suppress disorder in an on-going conference. A conference bridge may provide multi-mode speaker selection to provide automated conference moderation for a disorderly conference.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
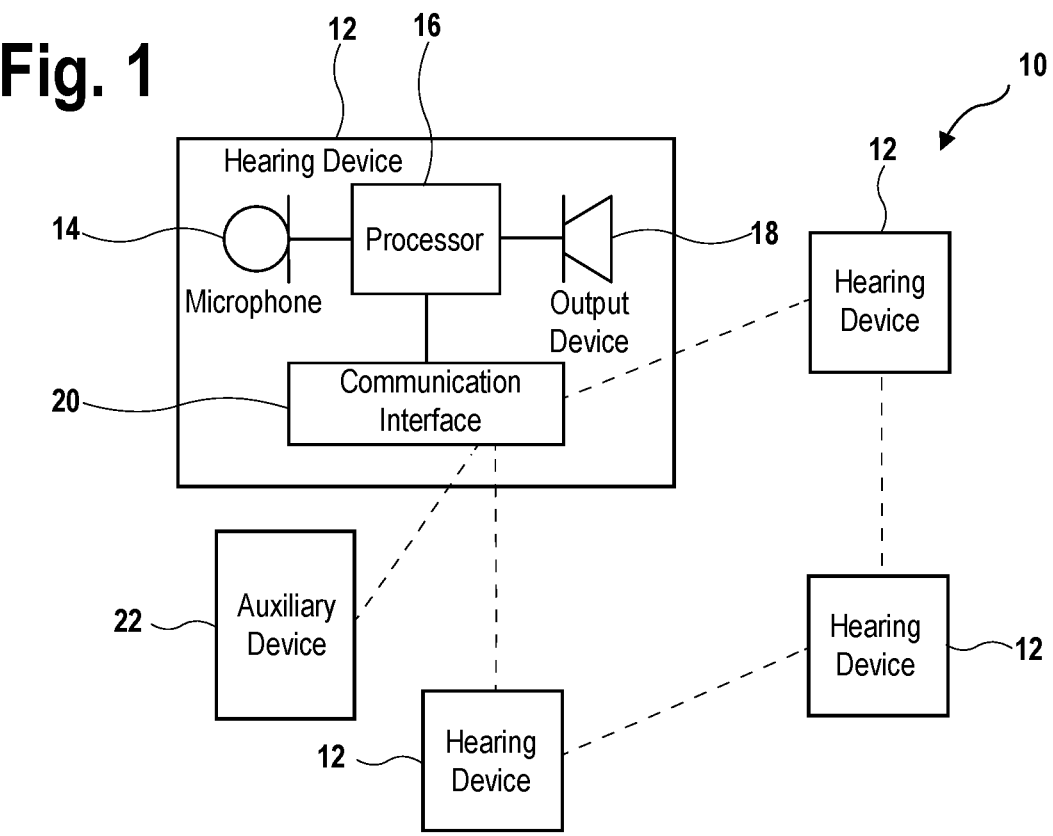
FIG. 1 schematically shows a hearing device system according to an embodiment.

An automated method is provided in which the signal-to-noise ratio in a hearing system composed of several hearing devices, in which audio signals are sent from an active speaker to other users of the hearing devices, is increased.

This is achieved by the subject-matter of the independent claims. Further exemplary embodiments are evident from the dependent claims and the following description.

An aspect described herein relates a method for controlling hearing devices, each hearing device being worn by a user, the hearing devices being communicatively interconnected with each other for data exchange to form a hearing device system.

A hearing device may include a processor, a microphone, a loudspeaker, a memory, and/or a housing, and other electronical and mechanical components. Examples of hearing devices are Behind-The-Ear (BTE), Receiver-In-Canal (RIC), In-The-Ear (ITE), Completely-In-Canal (CIC), and Invisible-In-The-Canal (IIC) devices. A hearing device may be a hearing aid adapted for compensating a hearing loss of a user.

Each of the hearing devices may comprise a data communication interface, such that it is adapted for communicating with the other hearing devices.

According to an embodiment, the method comprises: acquiring a sound signal of each user with a microphone of the hearing device of the user. The method and the hearing device system may be used, when the users of the hearing devices have a conversation, for example during a meeting or conference. During the conversation, the microphone of a hearing device may acquire a sound signal of the voice of the user. The hearing system may transmit this sound signal to other hearing devices of the hearing system, where it may be output by the loudspeakers of the other hearing devices.

According to an embodiment, the method comprises: determining from the sound signal a speaker signal, which indicates, whether the user is a speaking user. Each of the hearing devices may be adapted for own-voice detection. A voice signal of the user may be extracted from the audio signal, for example with a beamformer and the speaker signal may be 1, when the voice signal has a magnitude higher than a threshold. Otherwise, the speaker signal may be 0. The audio signal, the voice signal, the speaker signal and further signals mentioned herein may be digital signals. In particular, they may be signals, which are time-dependent.

According to an embodiment, the method comprises: determining a priority score for each user from the speaker signal of the user. The priority score may be an indicator and/or numerical value, indicating the priority of the user with respect to speaking. For example, when the user has started speaking, the priority score may be high and may decrease, when the user continues speaking.

According to an embodiment, the method comprises: outputting sound signals from speaking users to the users via the hearing devices of the users, such that sound signals from speaking users with a priority score smaller than a threshold are muted. A speaking user may be a user that has a speaker signal indicating that he is speaking. It may be that a processed sound signal, such as the voice signal extracted from the audio signal acquired at a first hearing device, is sent to a second hearing device. It also may be that the audio signal is output by the second hearing device.

To mute an audio signal may mean that the audio signal is not output at the hearing devices at all. It also may be that an audio signal is muted by damping it by a higher factor as unmuted audio signals.

In particular, only those audio signals of users, which have a specific priority score, may be output at a hearing device. Thus, the number of audio signal output by the hearing device may be reduced, which may increase the signal-to-noise ratio at the hearing device. Thus may support in particular hearing impaired persons following a discussion with many speakers.

The priority score may be a numerical value, which may be higher for a user having a higher priority for speaking. The threshold with which the priority scores of the users are compared by a fixed threshold or a dynamical threshold. For example, the threshold may be determined, such that maximal a specific number of users is allowed to speak.

According to an embodiment, the method comprises: determining for each user a speaking time from the speaker signal. In general, an actual speaking time and/or an overall speaking time may be determined. The actual speaking time may be the time, since the user has begun to speak without stopping. The overall speaking time may be time during which the user has spoken, since a specific time point, such as the beginning of the meeting or conference.

According to an embodiment, the priority score of a user is decreased, when the actual speaking time of the user is higher than a threshold. When the user starts to speak, the priority score may be set to a starting value. After a specific time (such as 5 minutes), this starting value may be continuously decreased.

According to an embodiment, the priority score of a user is decreased, when his overall speaking time is higher than an overall speaking time of another user. The users may be ordered according to their overall speaking times. A user with a higher overall speaking time may have a lower or decreased priority score as a user with a lower overall speaking time.

According to an embodiment, the priority score of a user is determined from his speaker signal and the speaker signals from other users. All speaker signals may be used for prioritizing the users. The priority score of a user may be decreased, when the speaker signal of the user indicates starts to speak, during another user is speaking. It is possible to determine from the speaker signals, when one user is interrupting another user. A user, who is interpreting another user, may receive a lower or decreased priority score.

According to an embodiment, at least one of an actual speaking time, an overall speaking time and speaker interruptions are determined for a user from the speaker signals and the priority score of the user is determined by weighting at least one of the actual speaking time, the overall speaking time and the speaker interruptions. For example, one, two or more of these properties may be assigned with numerical values, which may be multiplied with a weight factor and which may be added. The actual and overall speaking time may be determined in time units (such as seconds). The speaker interruptions may be provided as a number.

According to an embodiment, the method comprises: determining a punishment score for each user from the speaker signal of the user. It may be that additionally to the priority score a punishment score is determined independent from the priority score. The punishment score may be indicative of users, who should be excluded from the conversation. For example, the sound signal of a user may be muted, when the punishment score is higher than a threshold. It may be that the priority score would allow a user to speak but that the user has a punishment score, which results in a muting of the user.

According to an embodiment, the punishment score of a user depends on the number of times, how often the speaker signal of the user indicates that the user starts to speak, during another user is speaking. In other words, the punishment score of a user may be determined from the speaker interruptions of the user. However, also other behavior may be detected, which may result in an increase of the punishment score, such as yelling, i.e. a magnitude of the voice signal higher than a threshold.

According to an embodiment, users are assigned to different user roles. For example, one or more of the users may be declared as moderators, teachers, etc., i.e. persons, which are allowed to speak more often than other users. The assignment may be performed with a user interface of an auxiliary device connected to the hearing system.

The priority score of a user may be determined dependent of the user role of the user. For example, different roles may have different weightings, which are used for calculating the priority score from the actual and overall speaking time, the speaker interruptions, etc.

According to an embodiment, the method comprises: determining a conversation chaos value from the punishment scores of the users. As higher the punishment scores of the user, as lower may be the order of the conversation. For example, increased speaker interruptions and/or increased yelling users may indicate a more chaotic conversation. The conversation chaos value indicative of this order/chaos of the conversation may be determined by adding punishment scores, which may be weighted.

According to an embodiment, the conversation chaos value is determined from the punishment scores by weighting punishment scores. For example, the punishment scores may be taken from three categories, such as "green", "yellow" and "red" and these categories may be weighted differently. "red" may have a higher weight value as "yellow", for example.

According to an embodiment, the threshold for the priority scores for muting users is selected based on the conversation chaos value. For example, when the conversation chaos value is low, the threshold may be high and no user may be muted at all. When the conversation chaos value increases, the threshold may be selected, such that the audio signals of only some of the users are forwarded to other users. For a high conversation chaos value, such as a conversation chaos value higher than a predefined threshold, the priority score threshold may be selected, such that all users except one user are muted.

According to an embodiment, the priority score of a user is determined by weighting at least one of the actual speaking time, the overall speaking time and the speaker interruptions and the weighting is selected based on the conversation chaos value. Another possibility is to adapt the weighting of the priority score according to the conversation chaos value. For example, for a lower conversation chaos value, the actual speaking time and/or the number of speaker interruptions may not be considered or considered with lower weightings, as compared to a higher conversation chaos value.

Further aspects described herein relate to a computer program for controlling hearing devices, which, when being executed by a processor, is adapted to perform the method as described in the above and in the following and to a computer-readable medium, in which such a computer program is stored. A computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect described herein relates to a hearing device system comprising a plurality of hearing devices, each hearing device being worn by a user and the hearing devices being communicatively interconnected with each other for data exchange, wherein the hearing device system is adapted to perform the method as described in the above and the below. For example, the method may be completely performed by the processors of the hearing devices. However, it also may be that some steps of the methods are performed by auxiliary devices carried by the users (such as smartphones) and/or that some steps of the method are performed by an internet server, to which the hearing devices may be connected.

It is understood that features of the method as described in the above and in the following may be features of the computer program, the computer-readable medium and the hearing system as described in the above and in the following, and vice versa.

These and other aspects will be apparent from and elucidated with reference to the embodiments described hereinafter.

FIG. 1 shows a hearing device system 10, which comprises several hearing devices 12. Each hearing device 12 may be worn by a user on his head, for example behind the ear and/or in the ear.

Each hearing device 12 comprises a microphone 14, a processor 16 and an output device 18, such as a loudspeaker. It also may be that the output device 18 is adapted for supplying a cochlear implant. In an operation mode, the hearing device 12 acquires a sound signal with the microphone 14, the processor 16 processes the sound signal, for example for compensating a hearing loss of the user, and outputs the processed sound signal with the output device 18.

Each hearing device 12 furthermore comprises a communication interface 20 for wireless data communication with another hearing device 12 (or further devices). All the hearing devices 12 in the hearing device system 10 may be interconnected with each other in such a way and/or may form a communication network. In a further operation mode, a sound signal acquired with a microphone of one of the hearing devices 12 may be transmitted via this network to another hearing device 12 and may be output there with the output device 18 of the other hearing device 12.

It may be that a hearing device 12 is communicatively interconnected via the communication interface 20 with an auxiliary device 22, which also may be carried by the user. For example, the auxiliary device 22 may be a smartphone. One, some or all of the users may carry such an auxiliary device 22.

Figure 2:
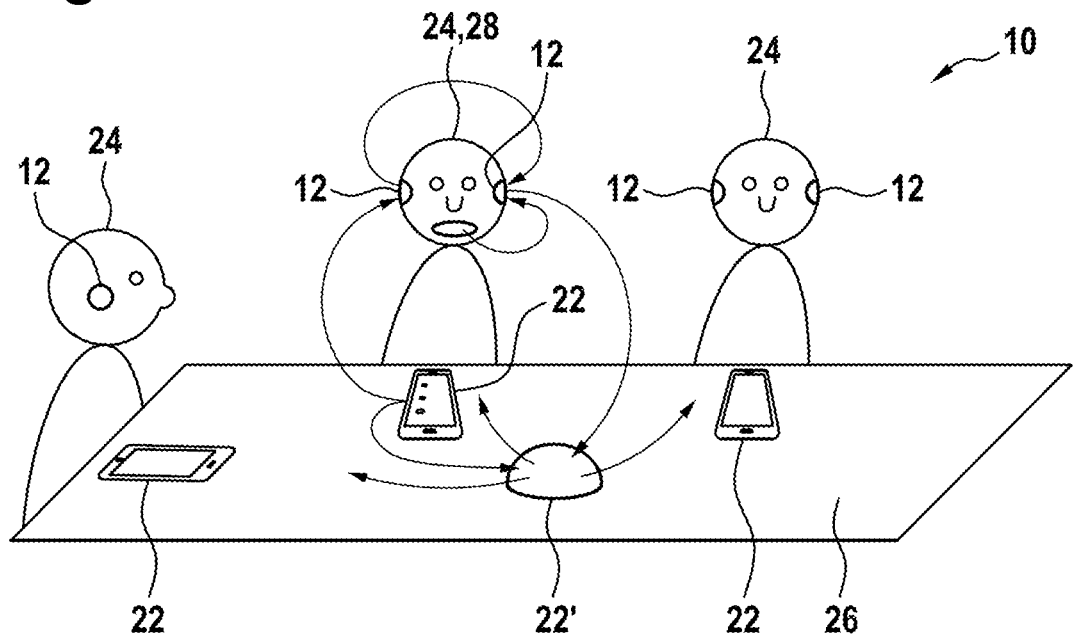
FIG. 2 schematically shows a hearing device system according to a further embodiment.

FIG. 2 shows a further embodiment of a hearing device system 10, which is used by several users 24 sitting around a table 26 in a conversation. Every user wears one or two hearing devices 12 behind his or her ear(s). As shown in FIG. 2, the hearing devices 12 may communicate with each other and auxiliary devices 22, such as a smartphone or a network device 22'.

For example, the voice of the speaker 28 may be picked up by the corresponding hearing device, streamed via the communication interface 20 to the auxiliary devices 22 and/or network device 22'. The network device 22' may mix the streams, i.e. audio signals, as described above and below and may send the mixed audio signals back to the hearing devices 12, where the mixed audio signals are output. It has to be noted that these method steps also may be performed by the hearing devices 12 alone and/or by a server connected to the hearing devices 12, for example via the network device 22'.

The auxiliary devices 22 and/or the network device 22' may have a user interface, which may be used by the users 24 for changing settings of the hearing device system 10, such as the roles of the users during the conversation.

In general, the data stream (which may comprise the acquired audio signals) between the hearing devices 12 and the network device 22' might be proprietary. The exchange of metadata between the auxiliary device 22 of a user 24 and the hearing device 12 of a user 24 and/or between an auxiliary device 22 and the network device 22' and/or between a hearing device 12 and the network device 22' may be via Bluetooth. Alternatively, the data streams and/or audio signals may be transferred via Bluetooth.

Figure 3:
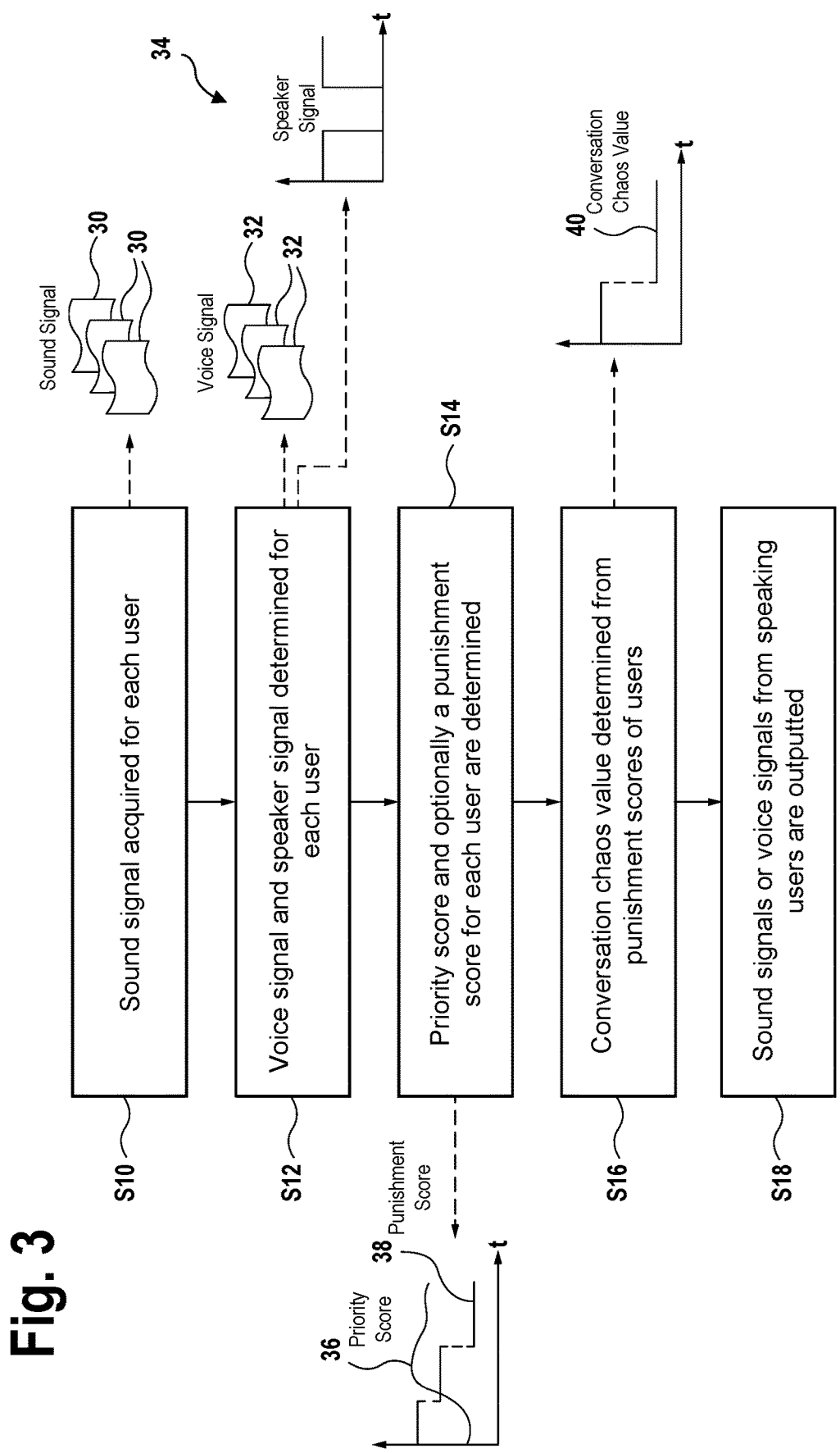
FIG. 3 shows a flow diagram for a method for controlling hearing devices according to an embodiment.

FIG. 3 shows a flow diagram for a method for controlling the hearing devices 12 and/or the hearing device system 10 of FIG. 1 or 2. The method may be performed automatically by the hearing devices 12 (for example by their processors), i.e. the hearing device system 10 may be seen as a distributed system. It also may be that the method is at least partially performed by the one or more auxiliary devices 22, the network device 22' and/or by a server, which may be connected to the hearing devices 12, the network device 22' and/or the one or more auxiliary devices 22 via the Internet. The method steps or at least a part of the method steps may be performed in a cloud based system.

In step S10, a sound signal 30 is acquired for each user 24 with the microphone 14 of the hearing device 12 of the user 24. It has to be noted that the sound signal 30 may comprise digitized data and/or may be composed of data packets. The sound signal 30 may be indicative of the sounds generated in the vicinity of the user 24 and/or by the user 24. In particular, when the user 24 is speaking, the respective sound signal usually contains the voice of the user with a rather high signal-to-noise ratio.

It may be that also persons without a hearing device are participants of the conversation and that these persons are using an auxiliary device 22 with a microphone directly for acquiring a sound signal. These sound signals may be processed in the following as the sound signals 30 acquired by the hearing devices 12.

In step S12, a voice signal 32 and a speaker signal 34 is determined for each user 24 from the sound signal 30 of the user 24. For example, a beamformer system may be used to pick-up the own-voice of the user 24 and/or to extract the voice signal 32 from the sound signal 30.

The speaker signal 34 may be determined directly from the sound signal 30, for example, by assuming that when the level of the sound signal 30 is higher than a threshold, the corresponding user is speaking. The speaker signal 34 may be a signal over time having the values 1 (user is speaking) and 0 (user is not speaking).

In step S14, a priority score 36 and optionally a punishment score 38 for each user 24 are determined from the speaker signal 34 of the user 24. As the speaker signal 34, the priority score 36 and the punishment score 38 may be signals over time and/or may take a specific numerical value at a time point.

The priority score 36 for a user 24 may be determined from a speaking time, which is determined from the corresponding speaker signal 34. An actual speaking time may be the time, since the user 24 has started to speak. An overall speaking time may be the sum of all actual speaking times.

In general, the priority score 36 may be decreased, when the speaking time of a user 24 increases. For example, the priority score 36 of a user 24 may be decreased, when the actual speaking time of the user is higher than a threshold. It also may be that the priority score 36 of a user 24 is decreased, when his overall speaking time is higher than an overall speaking time of another user 24. Specific examples for this are shown below in the table.

It also may be that the priority score 36 of a user 24 is decreased, when the speaker signal 34 of the user indicates that the user 24 starts to speak, during another user 24 is speaking, i.e. when the user 24 interrupts another user.

The above-mentioned values also may be weighted with weight values and the results may be summed up to determine the priority score 36. For example, the priority score 36 of the user 24 is determined by weighting at least one of the actual speaking time, the overall speaking time and the speaker interruptions.

In the following, examples of intermediate values for determining a priority score 36 for a user 24 are shown. For specific values and properties, such as the actual speaking time, the overall speaking time, etc., rules are provided, how the intermediate values/weighted values can be calculated. In general, the following symbols are used: s1=score for rule 1, w1=weight for rule 1, . . . , u1=user 1).

In general, the higher the priority score 36, the higher the priority of the user 24. Conversely, the lower the value of property, the higher the priority of the user 24. The value of the property may be inverse to the score, i.e. priority=1 is highest.

A further example for calculating the priority scores is

Priority_score($u1$)=$w1*s1+w2*s2+w3*s3-w*s4$

I.e. the priority score may be determined by weighting the scores of the different properties.

| Properties and rules | Description | Weight | User u1 | u2 | . . . | un |
|---|---|---|---|---|---|---|
| Property 1: | actual speaking time, active at the moment [min] | 1 | 3 | 0 | | 0 |
| Rule 1 and resulting score | If active <5 min, score = 10, elseif active >5 min, score = 10 − (active time − 5)*2 | | 10 | 0 | | 0 |
| Property 2: | Overall speaking time, overall active duration [sec] | 0.5 | 600 | 60 | | 5 |
| Rule 2 and resulting score | Ranking between the users inversely to property 2 | | 0 | 5 | | 10 |
| Property 3 | Want to raise their voice next | 1 | — | no | | yes |
| Rule 3 and resulting score | If s1 = 0 AND s2 > 5 AND prop3 = yes, s3 = s2, else s3 = 0. | | 0 | 0 | | 10 |
| Property 4 | # Interruption of active speaker | | 0 | 3 | | 0 |
| Rule 4 and resulting score | If #interruption = 0, user = green, elseif #interruption >= 1, user = yellow, elseif #interruption >= 3, user = orange. Alternatively, property 4 has no direct consequence, but has impact to the punishment score. | | green | orange | | green |
| Punishment score | Pun_score = rule 4. If user >= 3 times orange, user = red. | | green | orange | | green |
| Impact of punishment score | Green: no punishment, Yellow: punishment alert, Orange: blocked for 10 min, then count of #interruptions starts with #interruption = 0. Red: blocked for whole session. Listening is allowed. | | — | blocked | | — |
| Priority score | If punishment score is green OR yellow, priority = w1*s1 + w2*s2 + w3*s3, Else user is blocked | | 10 | blocked | | 15 |
| Impact of priority score | The priority score is mapped to a ranking. The channels of the users with the 2 highest priorities are open, all other channels are closed. | | Channel open: u1 is streamed to all other users | Channel closed: u2 is not streamed | | Channel open |

It is possible that the auxiliary devices 22 provide a user interface that displays the priority score 36. Each user 24 may have insight to his priority score 36, his priority and the reasoning for his rating. With this user interface, a user 24 also may indicate that he wants to raise his voice next (see property 3 in table above).

As shown in the table, also a punishment score 38 may be determined for each user 24. As the priority score, the punishment score 38 for each user 24 may be determined from the speaker signals 34 of the users 24. For example, the punishment score 38 of a user 24 may depend on the number of times, how often the speaker signal 34 of the user indicates that the user 24 starts to speak, during another user is speaking.

In the example of the table, the punishment score 38 comprises four different values, which may be represented with different colours. The colour "green" represents no punishment, the colour "red" represents the maximal possible punishment. An impact of the punishment score 38 may be that a user's speech is not streamed to the other users for the duration of 10 minutes, i.e. his audio signal 30 may be muted for this duration. After the duration, the punishment score 38 may decrease one value, for example from "orange" to "yellow". When the conversation has finished, all punishment scores 38 may be reset to zero. The reset of punishment score 38 may also be set by a user through the user interface, if he has an administrator and/or moderator role to do so.

In general, the properties in above table may contribute to the priority score 36 only, to the punishment score 38 only or to the priority score 36 and punishment score 38.

As already mentioned, users 24 may be assigned to different user roles. Such a user role may be meeting responsible, presenter, default/guest, meeting moderator, etc. According the different user roles, different rules may be assigned to the users. A presenter may have, for example, no speech duration limitation. A meeting moderator may set the user rules to support himself during moderation. The meeting moderator may have a relaxation of his punishment score 38.

The priority score 36 and/or the punishment score 38 of a user 24 may be determined dependent of the user role of the user 24. For example, weights may define, which rules are incorporated to derive the scores 36, 38 for each user role separately. Those weights may be set by a user 24 with the moderator role and/or by voting of all users via the user interfaces.

Following table shows an example with two user roles "presenter" and "default" and a corresponding weighting.

| Roles | presenter | default | default |
|---|---|---|---|
| Users | u1 | u2 | u3 |
| Weights for property 1 | w1(u1) = 0 | w1(u2) = 1 | w1(u3) = 1 |
| Weights for property 2 | w2(u1) = 0 | w2(u2) = 0.5 | w2(u3) = 0.5 |
| Weights for property 3 | w3(u1) = 0.3 | w3(u2) = 0.7 | w3(u3) = 0.7 |

In step S16, a conversation chaos value 40 is determined from the punishment scores 38 of the users 24. The conversation chaos value 40 may be seen as a measure to estimate the conversation chaos on a regular basis during the whole conversation. The conversation chaos value ccv, 40 may be calculated by $$ccv = \#yellow\_points * w\_yellow + \#orange\_points * w\_orange + \#red\_points + w\_red$$

wherein #yello_points (#orange_points, #red_points) is the number of users 24, who are yellow (orange, red) according to their punishment scores 38. w_yellow (w_orange, w_red) is a weight, which, for example, may be 1 for yellow (5 for orange, 10 for red).

The conversation chaos value 40 may be determined from the punishment scores 38 by weighting punishment scores 38 and/or summing the weighted punishment scores 38.

Further properties may be incorporated into the conversation chaos value ccv, 40:

How many speakers are active at the same time?

How much overlapping speech? This may be determined based on successful interruptions and/or failed interruptions.

How many conversational turns (how many times and/or how often changes the speaking user 28) take place within a certain time span?

These properties also may be weighted and, for example, added to the conversation chaos value ccv, 40.

The conversation chaos value ccv, 40 may be used as a control parameter, define how strict the rules to limit the number of active speakers 28? at the same time are executed and how strict conversation (chaos) is controlled. For example, the weightings for the priority score 36 may be selected based on the conversation chaos value 40.

As an example, there may be at least three control degrees for the conversation, such as "very strict", "medium" and "off". The control degrees may be selected automatically be the system 10, for example, when "ccv>10", then "control degree=default+1".

In the control degree "off", no constraints on the number of open channels may be provided, i.e. no user may be muted and/or no interventions may be performed.

In the control degree "very strict", the maximal impact of priority score 36 and punishment score 38, for example as described above, may be present.

In the control degree "medium", the rules and/or impacts may be relaxed up to a specific extent.

The rules and/or weightings for the priority score 36 may be relaxed. For example, not all rules are integrated into the priority score. Furthermore, the weightings for all rules and/or the rule parameters may be decreased, which may result in less distinct priority scores. When the ranking is not distinct for each user 24, the impact of automatic speaker selection may be relaxed. The more users 24 have the same priority score 36, the less control may be applied to the conversation. For example, if three users 24 have the same highest priority score 36, all 3 users may have equal rights without intervention of the system 10.

As a further example, the impact of the punishment score 38 may be relaxed, for example, instead of 10 minutes blocking a user 24, the user 24 may be only blocked for 2 minutes. Furthermore, the rules, which are incorporated into the punishment score 38, may be relaxed. For example in rule 4 in the first table above, instead of "#interruption >=1, user=yellow", "#interruption >=3, user=yellow" may be applied. It also may be that not all rules are incorporated into the punishment score 38.

It also may be that the control degree or allowable chaos may be set at the beginning of the meeting. This setting can be performed by all of the users by voting. The system 10 may take then the average. The setting also may be done by the meeting organizer (person), presenter (person), meeting moderator (person). It is also possible that assigned users, such as the three users with the best priority rating from the last meeting, perform the setting. All these settings may be input into the system 10 via the user interface of the auxiliary devices 22.

In step S18, the sound signals 30 or the voice signals 32 from the speaking users 28 are outputted and/or streamed to the users 24 via the hearing devices 12 of the users, wherein, depending on the priority score 36 and optionally the punishment score 38, some of the speaking users 28 may be muted. For example, the sound signals 30 (or the voice signals 32) from the speaking users 28 with a priority score 36 smaller than a threshold may be muted.

The threshold for the priority score 36 may be determined dynamically. For example, it may be chosen that always solely n users 24 (such as 1, 2, 3, ... users) are allowed not muted. As also can be seen in the first table, the threshold for the priority scores 36 for muting users 24 may be selected based on the conversation chaos value 40.

It also may be that users 24 with a punishment score 38 higher than a threshold are muted. As described above, a user 24 may be muted, when his punishment score 38 has the value "red", independently from the priority score 36.

When a speaking user 24 is muted, his stream may be faded out with a time constant, for example optimized to naturalness. This may include a time out duration, predefined for a specific conversational misbehavior. Instead of completely fading out a user 24, his streamed voice may get softer.

When an active speaker 24 is unmuted (i.e. when he was muted and the punishment score 38 and the punishment score 38 now indicate that he is allowed to speak), his stream may be faded in.

LIST OF REFERENCE SYMBOLS 10 hearing device system
12 hearing device
14 microphone
16 processor
18 output device
20 communication interface
22 auxiliary device
22' network device
24 user
26 table
28 speaker
30 sound signal
32 voice signal
34 speaker signal
36 priority score
38 punishment score
40 conversation chaos value While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for controlling hearing devices, each hearing device being worn by a user, the hearing devices being communicatively interconnected with each other for data exchange to form a hearing device system,
wherein the method comprises:
acquiring a sound signal of each user with a microphone of the hearing device of the user;
determining from the sound signal a speaker signal, which indicates, whether the user is a speaking user;
determining a priority score for each user from the speaker signal of the user;
determining a punishment score for each user from the speaker signal of the user, wherein the punishment score of the user depends on the number of times, how often the speaker signal of the user indicates that the user starts to speak, during another user is speaking;
outputting sound signals from speaking users to the users via the hearing devices of the users, such that sound signals from speaking users with a priority score smaller than a threshold are muted and the sound signal of the user is muted, when the punishment score of the user is higher than a threshold.

2. The method of claim 1, further comprising:
determining for each user a speaking time from the speaker signal;
wherein the priority score of a user is decreased, when the actual speaking time of the user is higher than a threshold; and/or
wherein the priority score of a user is decreased, when his overall speaking time is higher than an overall speaking time of another user.

3. The method of claim 1,
wherein the priority score of a user is determined from his speaker signal and the speaker signals from other users;
wherein the priority score of a user is decreased, when the speaker signal of the user indicates that the user starts to speak, during another user is speaking.

4. The method of claim 1,
wherein at least one of an actual speaking time, an overall speaking time and speaker interruptions are determined for a user from the speaker signals;
wherein the priority score of the user is determined by weighting at least one of the actual speaking time, the overall speaking time and the speaker interruptions.

5. The method of claim 1,
wherein users are assigned to different user roles;
wherein the priority score of a user is determined dependent of the user role of the user.

6. The method of claim 1, further comprising:
determining a conversation chaos value from the punishment scores of the users.

7. The method of claim 6,
wherein the conversation chaos value is determined from the punishment scores by weighting punishment scores.

8. The method of claim 6,
wherein the threshold for the priority scores for muting users is selected based on the conversation chaos value.

9. The method of claim 6,
wherein the priority score of a user is determined by weighting at least one of the actual speaking time, the overall speaking time and the speaker interruptions;
wherein the weighting is selected based on the conversation chaos value.

10. A non-transitory computer-readable medium for controlling hearing devices, each hearing device being worn by a user, the hearing devices being communicatively interconnected with each other for data exchange to form a hearing device system, the non-transitory computer-readable medium storing a computer program that, when executed, directs a processor to:
　　acquire a sound signal of each user with a microphone of the hearing device of the user;
　　determine from the sound signal a speaker signal, which indicates, whether the user is a speaking user;
　　determine a priority score for each user from the speaker signal of the user;
　　determining a punishment score for each user from the speaker signal of the user, wherein the punishment score of the user depends on the number of times, how often the speaker signal of the user indicates that the user starts to speak, during another user is speaking;
　　output sound signals from speaking users to the users via the hearing devices of the users, such that sound signals from speaking users with a priority score smaller than a threshold are muted and the sound signal of the user is muted, when the punishment score of the user is higher than a threshold.

11. A hearing device system comprising a plurality of hearing devices, each hearing device being worn by a user and the hearing devices being communicatively interconnected with each other for data exchange;
　　wherein the hearing device system is adapted to:
　　acquire a sound signal of each user with a microphone of the hearing device of the user;
　　determine from the sound signal a speaker signal, which indicates, whether the user is a speaking user;
　　determine a priority score for each user from the speaker signal of the user;
　　determine a punishment score for each user from the speaker signal of the user, wherein the punishment score of the user depends on the number of times, how often the speaker signal of the user indicates that the user starts to speak, during another user is speaking;
　　output sound signals from speaking users to the users via the hearing devices of the users, such that sound signals from speaking users with a priority score smaller than a threshold are muted and the sound signal of a user is muted, when the punishment score of the user is higher than a threshold.

\* \* \* \* \*